Dec. 18, 1962 S. P. SPENCE ET AL 3,069,434
PROCESS OF PRODUCING POLYGLYCIDYL ETHERS OF POLYHYDRIC PHENOLS
Filed June 16, 1959
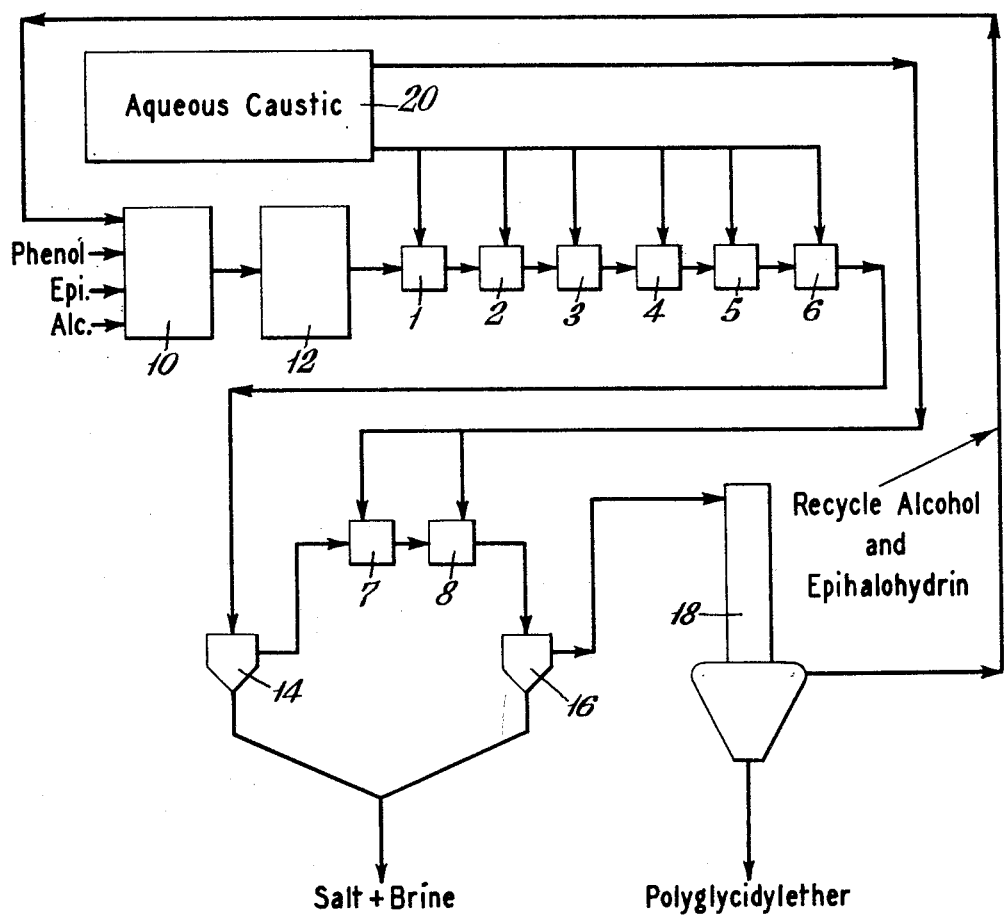
INVENTORS
SYDNEY P. SPENCE
ANSON R. GROVER
FELIX P. KLOSEK
RICHARD E. NICOLSON
BY *James C. Arrantes*
ATTORNEY

United States Patent Office 3,069,434
Patented Dec. 18, 1962

3,069,434
PROCESS OF PRODUCING POLYGLYCIDYL ETHERS OF POLYHYDRIC PHENOLS
Sydney P. Spence, Scotch Plains, Anson R. Grover, New Brunswick, Felix P. Klosek, Somerset County, and Richard E. Nicolson, Martinsville, N.J., assignors to Union Carbide Corporation, a corporation of New York
Filed June 16, 1959, Ser. No. 820,679
8 Claims. (Cl. 260—348.6)

This invention relates to an improved process for the production of polyglycidyl ethers of polyhydric phenols. More particularly, this invention relates to the continuous production of polyglycidyl ethers of polyhydric phenols by an improved process whereby substantially all of the unreacted starting materials are recovered and wherein the polyglycidyl ether produced contains predominantly a compound whose composition can be represented by the formula:

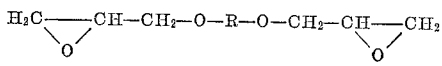

with R being the nucleus of the polyhydric phenol, and which is characterized by light color, by relatively low viscosity, and upon being hardened to an infusible, insoluble state, by an excellent heat distortion temperature.

Polyglycidyl ethers of polyhydric phenols have been generally produced by reacting epichlorohydrin with a polyhydric phenol in the presence of a base such as sodium hydroxide. Illustrative of such a reaction, epichlorohydrin reacts with 2,2-bis(p-hydroxyphenyl)-propane, commonly known as Bisphenol A, in the presence of sodium hydroxide to form a polyglycidyl ether product comprising a mixture of compounds whose compositions can be represented by the formula:

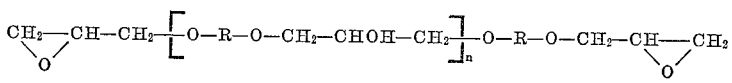

wherein R is the nucleus of the polyhydric phenol and $n$ is an integer having a value of from 0 to 15 and wherein the principal by-products of the reaction are salt and water.

It has not been possible, however, to adapt processes which are currently known for the production of polyglycidyl ethers on a continuous and commercially attractive basis. Attempts to so produce polyglycidyl ethers have resulted in a product which contains primarily a mixture of high molecular weight polymers whose compositions can be represented by the formula previously given wherein $n$ is an integer having a value of from 1 to 15. Such a product has an undesirable dark color, has an undesirable high viscosity, and when hardened to an infusible, insoluble state, has a relatively low heat distortion temperature. Moreover, salt, which is a by-product in the reaction, tends to clog the reaction system, thus interrupting the continuous and effective production of the polyglycidyl ether product.

The present invention provides for the production of excellent quality polyglycidyl ethers of polyhydric phenols on a continuous and commercially attractive basis. According to the present invention, a mixture containing a polyhydric phenol, an epihalohydrin in an amount sufficient to provide at least two molecules of epihalohydrin per phenolic hydroxyl group, and a saturated, aliphatic alcohol are fed into and through a series of eight reaction stages while an alkali metal hydroxide is continuously fed into each reaction stage in amounts such that in the first four reaction stages the coupling reaction between the epihalohydrin and the polyhydric phenol is the predominant reaction and proceeds essentially to completion, resulting in the production of the corresponding intermediate halohydrin ether, while in the last four reaction stages the dehydrohalogenation of the halohydrin ether to the corresponding polyglycidyl ether is the predominant reaction. By-products of the reaction, alkali metal halide and brine, are continuously removed from the system after the sixth and eighth reaction stages. The alcohol and unreacted epihalohydrin removed from the polyglycidyl ether are recycled back into the reaction system.

The improved process of the present invention is more fully explained by the following discussion and by reference to the accompanying drawing.

A feed mixture of a polyhydric phenol, epihalohydrin, such as epichlorohydrin, and a saturated, aliphatic alcohol is prepared batchwise, usually by introducing each material into a mixing tank 10 from whence the mixture is pumped into feed tank 12 and then pumped into the first of a series of eight reaction stages. It is also convenient to add the polyhydric phenol to a solution of an epihalohydrin and alcohol and to then allow the mixture to stand at room temperature, about 23° C., until the polyhydric phenol has completely dissolved in the solution. The preparation of the feed mixture is preferably accomplished at room temperature. Preparing the feed mixture at room temperature eliminates the possibility of any destruction of the epihalohydrin through reaction with the alcohol to produce undesirable by-products which may occur at temperatures of about 50° C. and higher.

The amount of epihalohydrin in the feed mixture is at least twice the stoichiometric amount required to react with the polyhydric phenol. For purposes of stoichiometric calculation, one epoxy group is deemed to react with one hydroxyl group. Thus, the feed mixture contains at least two molecules of epihalohydrin per phenolic hydroxyl group, and, if desired, can contain 10 of more molecules of epihalohydrin per phenolic hydroxyl group.

The amount of saturated, aliphatic alcohol present in the feed mixture ranges from about 15 to about 60 percent by weight based on the weight of the epihalohydrin. At least about 15 percent by weight of alcohol is necessary in order to insure that the coupling reaction between the epihalohydrin and the polyhydric phenol proceeds to completion. More than about 60 percent by weight of alcohol is undesirable as under these conditions a reaction occurs between the alcohol and the unreacted epihalohydrin in the seventh and eighth reaction stages to produce undesirable by-products which remain in the polyglycidyl ether, undesirably lowering its epoxy content.

The coupling reaction between an epihalohydrin and a polyhydric phenol in the presence of an alkali metal hydroxide to produce the intermediate halohydrin ether and the dehydrohalogenation of the halohydrin ether to produce the corresponding polyglycidyl ether can be represented by the following equations wherein the polyhydric phenol is 2,2-bis(p-hydroxyphenyl)propane, the epihalohydrin is epichlorohydrin, and the alkali metal hydroxide is sodium hydroxide.

COUPLING REACTION

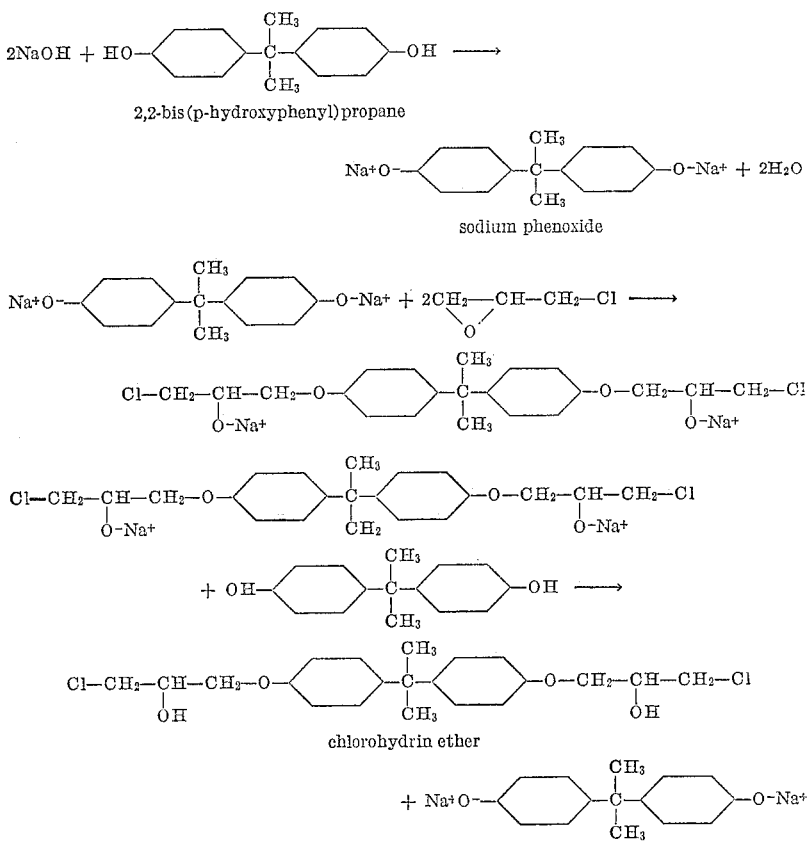

DEHYDROCHLORINATION REACTION

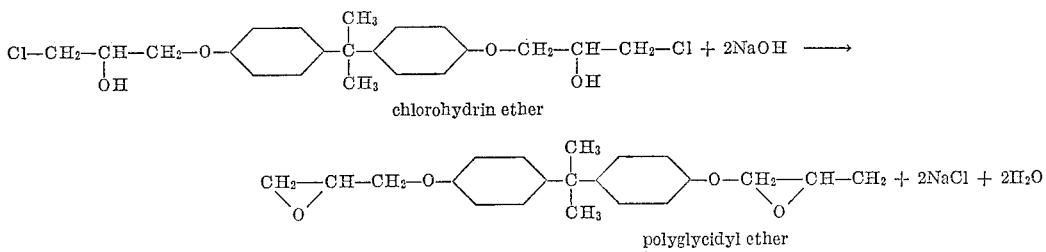

The sodium phenoxide is continuously regenerated, as indicated by the preceding equations, until all of the polyhydric phenol has reacted with the epichlorohydrin. If the alcohol is not present in at least about 15 percent by weight, the sodium phenoxide will precipitate out of the organic phase of the eraction mixture resulting in a decrease in the amount of chlorohydrin ether formed, thus reducing the yield of polyglycidyl ether. In addition, the presence of the alcohol in the feed mixture, by reason of its solvent action permits the dehydrohalogenation reaction to proceed substantially to completion.

Once the mixture containing the proper amounts of epihalohydrin, polyhydric phenol, and saturated, aliphatic alcohol has been prepared batchwise in mixing tank 10 and fed to feed tank 12, it is then continuously pumped into and out of a series of eight reaction stages which are numbered 1, 2, 3, 4, 5, 6, 7, and 8 in the accompanying drawing. Each reaction stage, actually reaction vessel, is equipped with an inlet for metering alkali metal hydroxide thereto, an agitator (not shown) which aids in dispersing the alkali metal hydroxide in the reaction mixture and a coil or jacket (not shown) through which can be circulated a cooling or heating medium as required, in addition to an inlet and outlet for the reaction mixture.

The alkali metal hydroxide is continuously pumped into each reaction stage from a convenient supply source, such as shown in the drawing and identified by numeral 20. Although not essential, it is convenient to meter the alkali metal hydroxide into each reaction stage as an aqueous solution which contains at least about 15 percent by weight of alkali metal hydroxide. It is preferred to use an aqueous solution containing about 50 percent by weight alkali metal hydroxide. At concentrations greater than about 50 percent alkali metal hydroxide, the aqueous solution is too viscous to allow facility of handling.

The total amount of alkali metal hydroxide metered into the reaction system ranges from about 95 to about 115 percent of the stoichiometric amount, i.e. amount required to react with the polyhydric phenol present in the feed mixture before any reaction has taken place. A preferred range of alkali metal hyroxide metered into the reaction system is from about 98 to about 105 percent of the stoichiometric amount.

For purposes of stoichiometric calculations, one phenolic hydroxyl group is deemed to react with one alkali metal ion.

The alkali metal hydroxide is metered into each of the first four reaction stages, 1, 2, 3, and 4, in amounts such that a catalytic amount of hydroxide is added to each of these stages. The coupling reaction between the polyhydric phenol and epihalohydrin, which requires only a catalytic amount of alkali metal hydroxide, i.e., an amount sufficient to catalyze the coupling reaction between the epihalohydrin and the polyhydric phenol, proceeds substantially to completion in reaction stages 1 through 4. By adding a catalytic amount of alkali metal hydroxide to each of the first four reaction stages, the competing dehydrohalogenation reaction which requires considerably larger amounts of alkali metal hydroxide, is suppressed and kept to a minimum. The actual amount of alkali metal hydroxide added to each of reaction stages 1, 2, and 3 can be varied from about 4 to about 6 percent of stoichiometric. In reaction stage 4 the actual amount of alkali metal hydroxide added can range from about 5 to about 15 percent of stoichiometric.

The coupling reaction in reaction stages 5 and 6 has proceeded substantially to completion and in reaction stages 5 and 6 the dehydrohalogenation reaction becomes the predominant reaction. Alkali metal hydroxide is metered into reaction stages 5 and 6 in amounts such that a total of from about 75 to about 90 percent of stoichiometric has been added in the first six reaction stages. From about 15 to about 25 percent of stoichiometric alkali metal hydroxide is metered into reaction stage 5. The remainder, within limits specified above, is metered into reaction stage 6. The remaining amount of alkali metal hydroxide is metered into the last two reaction stages 7 and 8 with from about 1 to about 5 percent of stoichiometric metered into reaction stage 8, and the remainder in reaction stage 7.

The rate of introduction of the reaction mixture into each reaction stage, the rate of withdrawal of the reaction mixture from each stage, and the rate of withdrawal of the polyglycidyl ether from the last reaction stage are so regulated that the volume of each of the reaction stages is maintained substantially constant and the dwell or residence time of the contents in each stage ranges from about 10 to about 20 minutes.

The temperature of the reaction mixture in the reaction stages is maintained between about 50° C. and about 80° C. Below about 50° C. there is some tendency for the alkali metal salt of the polyhydric phenol to precipitate out of the organic phase while above about 80° C. some deterioration of product quality of the polyglycidyl ether produced occurs.

As the reaction mixture is continuously fed into and out of each reaction stage, brine and solid salt which are formed during the reactions which are taking place in the system are transported as suspensions. Elimination of the brine and solid salt from the system is accomplished by continuously feeding the reaction mixture into and out of a decanter, designated by the numeral 14 in the drawing, just prior to reaction stage 7 and by feeding the crude polyglycidyl ether product into and out of a decanter designated by numeral 16, just after reaction stage 8. In each of the decanters 14 and 16 brine and the solid salt are continuously removed from the bottom of the decanter and the organic layer pumped out of the decanter at the top.

The brine, if not removed prior to the reaction stage 7, will undesirably dilute the alkali metal hydroxide in reaction stages 7 and 8, thus making much of the hydroxide unavailable for the dehydrohalogenation reaction. Consequently, the polyglycidyl ether obtained will exhibit poor product qualities due to the relatively large amounts of hydrolyzable halide remaining therein. The degree of completeness of the dehydrohalogenation reaction is determined from the measured amount of hydrolyzable halide in the polyglycidyl ether, usually expressed in terms of percent by weight based on the weight of the polyglycidyl ether. The amount of hydrolyzable halide present in the polyglycidyl ether is a measure of the unconverted halohydrin ether in the polyglycidyl ether. Removal of the brine and salt from the polyglycidyl ether at the end of the reaction cycle, i.e., at the end of the eighth reaction stage, is also necessary for if the brine and salt are allowed to remain, the polyglycidyl ether obtained will be characterized by an undesirable, unfilterable haze.

The rate of introduction into and the rate of withdrawal from each decanter are so regulated that the volume in each decanter is maintained substantially constant, whereby the brine-organic interface is sharply defined and the brine and salt can be rapidly removed therefrom. The dwell or residence time of the contents, from a practical standpoint, in each decanter ranges from about 1 to 15 minutes.

The temperature of the contents in each of the decanters is maintained at from about 50° C. to about 80° C. Optimum decantation temperatures range from about 70° C. to about 80° C. At a temperature of from about 70° C. to about 80° C., the interface between the brine and organic layers is sharply defined and the amount of organics, such as epichlorohydrin and alcohol taken up by the brine layer is relatively small.

The organic phase, the top layer in decanter 16, comprises primarily the polyglycidyl ether, epihalohydrin, and alcohol. The organic phase is pumped out of decanter 16 and the polyglycidyl ether separated from the epichlorohydrin-alcohol by any one of a number of known methods. It is convenient to feed the organic phase into a turbulent film type evaporator, as shown in the drawing and identified by numeral 18, wherein the epichlorohydrin and alcohol are evaporated off and recycled to the mixing tank 10 for reuse and the polyglycidyl ether recovered. If desired, the polyglycidyl ether can thereafter be treated to insure removal of any residual volatiles remaining and also to insure removal of any salt which may still be present. For example, the polyglycidyl ether can be subjected to a steam stripping operation to insure removal of any residual volatiles and a filtering operation to insure removal of any salt.

The term epihalohydrin as used herein is intended to encompass epichlorohydrin and epibromohydrin.

Illustrative of polyhydric phenols which are suitable to be used for reacting with epihalohydrin to produce the corresponding polyglycidyl ethers include among others the following: the mono-nuclear polyhydric phenols such as catechol, resorcinol, 2-methyl resorcinol, hydroquinone, hydroxyhydroquinone, 2-chlorohydroquinone, pyrogallol, phlorogucinol; the polynuclear polyhydric phenols such as 1,5-dihydroxynaphthalene, 4,4'-dihydroxydiphenyl, bis(p-hydroxyphenyl)methane, 1,1-bis(p-hydroxyphenyl)ethane, 2,2-bis(p - hydroxyphenyl) propane, 2,2-bis(2-hydroxy-4-tertiary butylphenyl) propane, 2,2-bis(2-chloro-4-hydroxyphenyl)propane, 2,2-bis (2-hydroxyphenyl(propane, 2,2-bis(2,4, - hydroxyphenyl) propane, 2,2-bis(2 - hydroxynaphthyl)pentane, 2,2 - bis (2,5-dibromo-4-hydroxyphenyl)butane, bis(p - hydroxyphenyl)sulfone, 1,2,2 - tris(p - hydroxyphenyl)propane, 1,1,5,5-tetra(p-hydroxyphenyl)pentane, as well as the polynuclear phenols described in United States patent to Bender et al. 2,506,486. Among other suitable polyhydric phenols are the complex polyhydric phenols illustrative of which are the Novolac resins obtained by the acid catalyzed condensation of phenol, p-cresol, or other substituted phenols with aldehydes such as formaldehyde. A detailed discussion of Novolac resins is to be found in a book by T. S. Carswell entitled "Phenoplasts," published in 1947 by Interscience Publishers of New York; condensates of phenols with aliphatic diols such as described in United States Patent 2,321,620 to E. C. Pratt; condensates of phenols with unsaturated fatty oils such as described in United States Patent 2,031,586 to Josef Binapli et al. and other like compounds free of all other functional groups which would interfere with the production of the desired polyglycidyl ethers.

Among suitable saturated aliphatic alcohols which can be used in the present invention can be noted methanol, ethanol, propanol, isopropanol, butanol, and mixtures thereof. Water can also be tolerated in the alcohol, up to about 20 percent by weight based on the weight of the alcohol.

Alkali metal hydroxides suitable for purposes of this invention are sodium hydroxide, and potassium hydroxide.

In the following examples, which are illustrative and not intended in any way to limit the scope of the invention, organic feed mixtures of epichlorohydrin, alcohol, and a polyhydric phenol were prepared batchwise at room temperature in a 250 gallon stainless steel mixing tank. Epichlorohydrin and alcohol were fed into the mixing tank and then the polyhydric phenol added. Feed mixtures so prepared were then pumped out of the mixing tank into a 250 gallon stainless steel feed tank from whence the mixture was pumped into the reaction system. In operation, recycle epichlorohydrin-alcohol mixture which was separated from the polyglycidyl ether was pumped back into the mixing tank where the composition of the recycled mixture was determined by a refractive index measurement. Fresh epichlorohydrin and fresh alcohol were then fed into the mixing tank to provide a feed mixture, upon adding the polyhydric phenol, having reactants and alcohol present in proper amounts, as previously discussed.

The feed mixture was continuously pumped from the feed tank into and through a reaction system in which each of the eight reaction stages consisted of reaction vessels 11 gallons in volume. The decanters consisted of vessels having a volume of 3 gallons.

The composition of the ethyl alcohol used was as follows: ethanol, 84.3 percent by weight; methanol, 8.8 percent by weight; and water, 6.9 percent by weight.

In determining the heat distortion temperatures noted in the examples, the polyglycidyl ether was first hardened by admixing therewith, 4,4′-methylene dianiline, curing at 85° C. for 20 hours, and then annealing the composition for 3 hour at 160° C. Sufficient amount of 4,4′-methylene dianiline was used to provide one aminohydrogen per each epoxy group. The heat distortion temperatures were then determined according to ASTM No. D–248–45T.

*Example I*

Continuous production of polyglycidyl ether of 2,2-bis-(p-hydroxyphenyl)propane was effected by feeding a solution of epichlorohydrin, ethyl alcohol, and 2,2-bis(p-hydroxyphenyl)propane, wherein the mole ratio of epichlorohydrin to the polyhydric phenol was 10 to 1 and the amount of alcohol present in the solution was 36.3 percent based on the weight of the epichlorohydrin, into the first of a series of eight reaction zones. The mixture was continuously pumped into and out of each of the first six reaction zones at the rate of 486 lbs. per hour while aqueous sodium hydroxide, containing about 50 percent by weight sodium hydroxide was continuously metered into the first six reaction zones at the following rates: reaction zone 1, 2.4 lbs. per hour; reaction zone 2, 2.4 lbs. per hour; reaction zone 3, 2.4 lbs. per hour; reaction zone 4, 5 lbs. per hour; reaction zone 5, 11.7 lbs. per hour; and in reaction zone 6, 17.7 per hour.

At the end of the sixth reaction zone 85 percent of the total amount of sodium hydroxide had been added to the system.

From reaction zone 6 the mixture was continuously pumped into a decanter at the rate of 528 lbs. per hour from where the salt was removed at the rate of 18.5 lbs. per hour and the brine removed at the rate of 50 lbs. per hour. The organic phase was continously pumped out of the decanter into reaction zone 7, and then out of reaction zone 7 and into reaction zone 8 at the rate of 460 lbs. per hour. The aqueous sodium hydroxide solution was continuously metered into reaction zone 7 at the rate of 6 lbs. per hour and into reaction zone 8 at the rate of 1.5 lbs. per hour.

The total sodium hydroxide metered into the system was 100 percent of the stoichiometric amount.

The contents of reaction zone 8 were continuously pumped into a decanter at the rate of 467 lbs. per hour. Salt was removed from the decanter at the rate of 3.4 lbs. per hour and brine was removed at the rate of 8.4 lbs. per hour.

The organic phase was pumped out of the decanter into a turbulent film type evaporator at the rate of 455 lbs. per hour from which an epichlorohydrin-alcohol mixture was condensed, pumped out, and recycled into the reaction system at the rate of 350 lbs. per hour. The alcohol phase of the mixture comprised 90.3 lbs. The polyglycidyl ether was recovered from the evaporator at the rate of 100 lbs. per hour.

The temperature of the contents in each of the reaction zones and in each of the decanters was maintained at 65° C. Dwell or residence time of the contents in each of the reaction zones was 15 minutes and in each of the decanters, 5 minutes. The polyglycidyl ether had an excellent light color, an epoxide equivalent weight of 190, and a viscosity in centistokes at 25° C. of 9000.

The polyglycidyl ether contained 77 percent by weight of the diglycidyl ether having a composition represented by the formula in column 1 of the specification wherein $n$ is equal to 0. The polyglycidyl ether had a heat distortion temperature of 150° C.

*Example II*

The procedure of Example I was repeated using the same reaction conditions and reactants with the exception that the polyglycidyl ether recovered was subjected to a filtering operation to insure removal of salt.

The polyglycidyl ether had an excellent light color, an epoxide equivalent weight of 190 and a viscosity in centistokes at 25° C. of 9200.

The polyglycidyl ether contained 77 percent by weight of diglycidyl ether wherein $n$ is equal to 0.

The heat distortion temperature of the polyglycidyl ether was 149° C.

*Example III*

The procedure of Example I was repeated using the same reaction conditions and reactants with the exception that the mole ratio of epichlorohydrin to the polyhydric phenol was 6:1.

The polyglycidyl ether had an excellent light color, an epoxide equivalent weight of 191, and a viscosity in centistokes at 25° C. of 9700.

The polyglycidyl ether contained 76 percent by weight diglycidyl ether wherein $n$ is equal to 0.

The heat distortion temperature of the polyglycidyl ether was 148° C.

What is claimed is:

1. Method for the continuous production of a polyglycidyl ether which comprises continuously feeding a mixture containing a polyhydric phenol, an epihalohydrin selected from the group consisting of epichlorohydrin and epibromohydrin in an amount sufficient to provide at least 2 molecules of epihalohydrin per phenolic hydroxyl group into the first of a series of six reaction stages, continuously feeding the contents of each reaction stage into the next succeeding stage while continuously metering an alkali metal hydroxide thereto in the following amounts: from about 4 to about 6 percent of stoichiometric into each of the first three reaction stages, from about 5 to about 15 percent of stoichiometric into the fourth reaction stage, from about 15 to about 25 percent of stoichiometric into the fifth reaction stage, an amount into the sixth reaction stage such that a total of from about 75 to about 90 percent of stoichiometric is added into the first six reaction stages, continuously feeding the contents of reaction stage 6 comprising a brine layer, an organic layer, and salt into a decantation stage and continuously removing the salt and brine layer from the organic layer, continuously feeding the organic layer into and out of a seventh and eighth reaction stage while metering alkali metal hydroxide into said stages in the following amounts: from about 1 to about 5 percent of stoichiometric into the eighth reaction stage and the remainder into the seventh reaction stage, the total amount of alkali metal hydroxide added to the system ranging from about 95 to about 115 percent of stoichiometric, continuously feeding the contents of the eighth reaction stage comprising brine, salt, and an organic layer into a second decantation stage, continuously removing the organic layer therefrom and recovering the polyglycidyl ether from said organic layer, the rate of feed into and out of each reaction stage and each decantation stage being such that the volume in the reaction stages and in the decantation stages is substantially constant.

2. Method for the continuous production of a polyglycidyl ether which comprises continuously feeding a mixture containing a polyhydric phenol, an epihalohydrin selected from the group consisting of epichlorohydrin and epibromohydrin in an amount sufficient to provide at least 2 molecules of epihalohydrin per phenolic hydroxyl group, and a saturated aliphatic alcohol having a maximum of 4 carbon atoms in an amount of about 15 to about 60 percent by weight, based on the weight of said epihalohydrin into the first of a series of six reaction stages, continuously feeding the contents of each reaction stage into the next succeeding stage while continuously metering an alkali metal hydroxide thereto in the following amounts: from about 4 to about 6 percent of stoichiometric into each of the first three reaction stages, from about 5 to about 15 percent of stoichiometric into the fourth reaction stage, from about 15 to about 25 percent of stoichiometric into the fifth reaction stage, an amount into the sixth reaction stage such that a total of from about 75 to about 90 percent of stoichiometric is added into the first six reaction stages, continuously feeding the contents of reaction stage 6 comprising a brine layer, an organic layer, and salt into a decantation stage and continuously removing the salt and brine layer from the organic layer, continuously feeding the organic layer into and out of a seventh and eighth reaction stage while metering alkali metal hydroxide into said stages in the following amounts: from about 1 to about 5 percent of stoichiometric into the eighth reaction stage and the remainder into the seventh reaction stage, the total amount of alkali metal hydroxide added to the system ranging from about 95 to about 115 percent of stoichiometric, continuously feeding the contents of the eighth reaction stage comprising brine, salt, and an organic layer into a second decantation stage, continuously removing the organic layer therefrom and recovering the polyglycidyl ether from said organic layer, the rate of feed into and out of each reaction stage and each decantation stage being such that the volume in the reaction stages and in the decantation stages is substantially constant and the dwell time of the contents in each reaction stage is from about 10 to 20 minutes and in each decantation stage from about 1 to about 15 minutes.

3. Method as defined in claim 2 wherein the total amount of alkali metal hydroxide added to the system ranges from about 98 to about 105 percent of the stoichiometric amount.

4. Method as defined in claim 2 wherein the epihalohydrin is epichlorohydrin.

5. Method as defined in claim 2 wherein the polyhydric phenol is 2,2-bis(p-hydroxyphenyl)propane.

6. Method as defined in claim 2 wherein the alkali metal hydroxide is sodium hydroxide.

7. Method as defined in claim 2 wherein the alkali metal hydroxide is added as a 50 percent by weight aqueous solution.

8. Method as defined in claim 2 wherein the temperature of the contents in the reaction stages is from about 50 to about 80° C. and the temperature of the contents in the decantation stages is from about 50° C. to about 80° C.

References Cited in the file of this patent

UNITED STATES PATENTS

| | | |
|---|---|---|
| 2,467,171 | Werner et al. | Apr. 12, 1949 |
| 2,582,985 | Greenlee | Jan. 22, 1952 |
| 2,615,008 | Greenlee | Oct. 21, 1952 |
| 2,640,037 | Parry et al. | May 26, 1953 |
| 2,694,694 | Greenlee | Nov. 16, 1954 |
| 2,731,444 | Greenlee | Jan. 17, 1956 |
| 2,735,829 | Wiles et al. | Feb. 21, 1956 |
| 2,801,227 | Goppel | July 30, 1957 |
| 2,824,855 | Freeman et al. | Feb. 25, 1958 |
| 2,848,435 | Griffin et al. | Aug. 19, 1958 |
| 2,892,849 | St. Clair | June 30, 1959 |
| 2,898,349 | Zuppinger et al. | Aug. 4, 1959 |
| 2,986,551 | Griffin et al. | May 30, 1961 |

FOREIGN PATENTS

| | | |
|---|---|---|
| 565,590 | Canada | Nov. 4, 1958 |